United States Patent [19]
Massaroni et al.

[11] Patent Number: 5,568,037
[45] Date of Patent: Oct. 22, 1996

[54] BATTERY CHARGING SYSTEM HAVING REMOTELY LOCATED CHARGING UNITS

[75] Inventors: Kenneth M. Massaroni, Plantation, Fla.; Vernon Meadows, Lilburn, Ga.

[73] Assignee: Motorola, Inc., Schaumburg, Ill.

[21] Appl. No.: 415,920

[22] Filed: Apr. 3, 1995

[51] Int. Cl.[6] .................................................. H02J 7/00
[52] U.S. Cl. .................................................. 320/2; 320/15
[58] Field of Search ....................................... 320/2, 15, 5

[56] References Cited

U.S. PATENT DOCUMENTS

| | | | |
|---|---|---|---|
| 5,055,763 | 10/1991 | Johnson et al. | 320/15 |
| 5,349,535 | 9/1994 | Gupta | 320/2 X |
| 5,371,453 | 12/1994 | Fernandez | 320/5 |
| 5,420,493 | 5/1995 | Hargadon et al. | 320/15 |

Primary Examiner—Stuart N. Hecker
Assistant Examiner—K. Shin
Attorney, Agent, or Firm—Kenneth M. Massaroni

[57] ABSTRACT

A system for charging batteries having a system controller (12) and battery charging units (16) powered by a common power line (14). The system controller (12) contains charge instructions corresponding to various types of batteries and the battery packs (18) have an identifier to identify which set of instructions are used to charge the battery pack (18). Further, the battery charging units (16) and the system controller communicate over the common power line (14) by power line carrier communications. When a battery pack (18) is inserted into one of the battery charging units (16), it obtains the battery identification and sends it to the system controller (12). The system controller (12) alternatively sends the corresponding charge instructions to the charger, or begins to run the charge instructions and controls the charger remotely. In either case, the battery pack (18) is charged according to the charge instructions.

12 Claims, 2 Drawing Sheets

BATTERY CHARGING SYSTEM HAVING REMOTELY LOCATED CHARGING UNITS

TECHNICAL FIELD

This invention relates in general to battery chargers and in particular to a system including a plurality of remotely located battery chargers.

BACKGROUND

Advances in electrochemistry have given users of portable electronic systems a wide range of choice for power sources. Examples of such power sources include batteries, capacitors, and hybrid battery-capacitor systems. As a result, manufacturers of portable electronic devices, such as portable two way radios, for example, offer several styles of batteries for the same device. A typical battery family for a two-way radio includes three chemical systems, each system offering 2 or 3 capacities. Each of these batteries has different charging requirements when charged. Accordingly a battery charger designed for a given battery family has to be quite sophisticated.

This is especially true if designers of the charger take into consideration future battery designs. When a customer purchases a charger the charge process programmed into the charger is the best current technology has produced. However, since technology in the area of portable batteries is advancing rapidly, five years after the charger is designed, it is no longer indicative of the state of the art. This gap in technology could result in obsolescence, and certainly a lack of ability to take advantage of the latest battery chemistry advances. As an example, consider a standard nickel cadmium battery. A battery pack designed five years ago with a specific battery cell size has a capacity 1.0 C. Today, the same size cells have 50% more capacity, or 1.5C. A charger designed five years ago to charge the five year old battery pack did so in 1 hour because the charge current it was designed to provide was equal to the C rate. Today's battery pack, made with the same size cells, now takes 1½ hours to charge in the old charger since the C rate it provides is only two thirds the rate required to recharge the 1.5C battery in 1 hour. To some, taking longer to recharge a battery would be considered a step back in technology.

To buy an improved charger later would likely cost more than the original charger. However, this is the problem facing many large infrastructure consumers such as civil emergency, federal and local governments, and industrial corporations. When these types of customers buy a portable two way radio communications system and associated infrastructure, a significant portion of the cost is attributed to battery chargers for the batteries used on the portable radios. To repeat that expenditure every five years, or whenever a major battery technology advance occurs, is unreasonable.

From a customer perspective, existing battery charging systems are somewhat limiting with regard to how many battery suppliers participate in a given market. If an original equipment manufacturer (OEM) provides a static system, that is one that does not allow for changing technology over time, the customer is limited only to batteries that can be charged by that system. If a more advanced battery chemistry is made commercially available, the customer cannot take full advantage of batteries made with cells based on the new chemistry without incurring the expenses of buying chargers designed with optimized charge processes for the new chemical system. The cost of new chargers compatible with the new cell chemistry may make the purchase economically unviable.

For example, lithium ion battery packs were recently made available for some cellular phone models. These batteries are smaller, lighter, and offer more "talk time" compared to the existing nickel cadmium batteries. However, lithium ion batteries require a different charge regime than nickel cadmium batteries; a charge regime none of the existing chargers had been designed to provide. In that case, it was possible to provide the lithium ion batteries with electronics to make them "retrofittable". The additional cost of such electronics may not be prohibitive to an individual; however consider an industrial customer planning on purchasing several hundred batteries.

Therefore there exists a need for a battery charging system which can simultaneously charge a plurality of batteries having a variety of different capacities and based on a variety of different electrochemical systems. This system should be able to keep current with developing battery technology at minimum cost to a customer.

DETAILED DESCRIPTION OF THE PREFERRED EMBODIMENT

Figure 1:
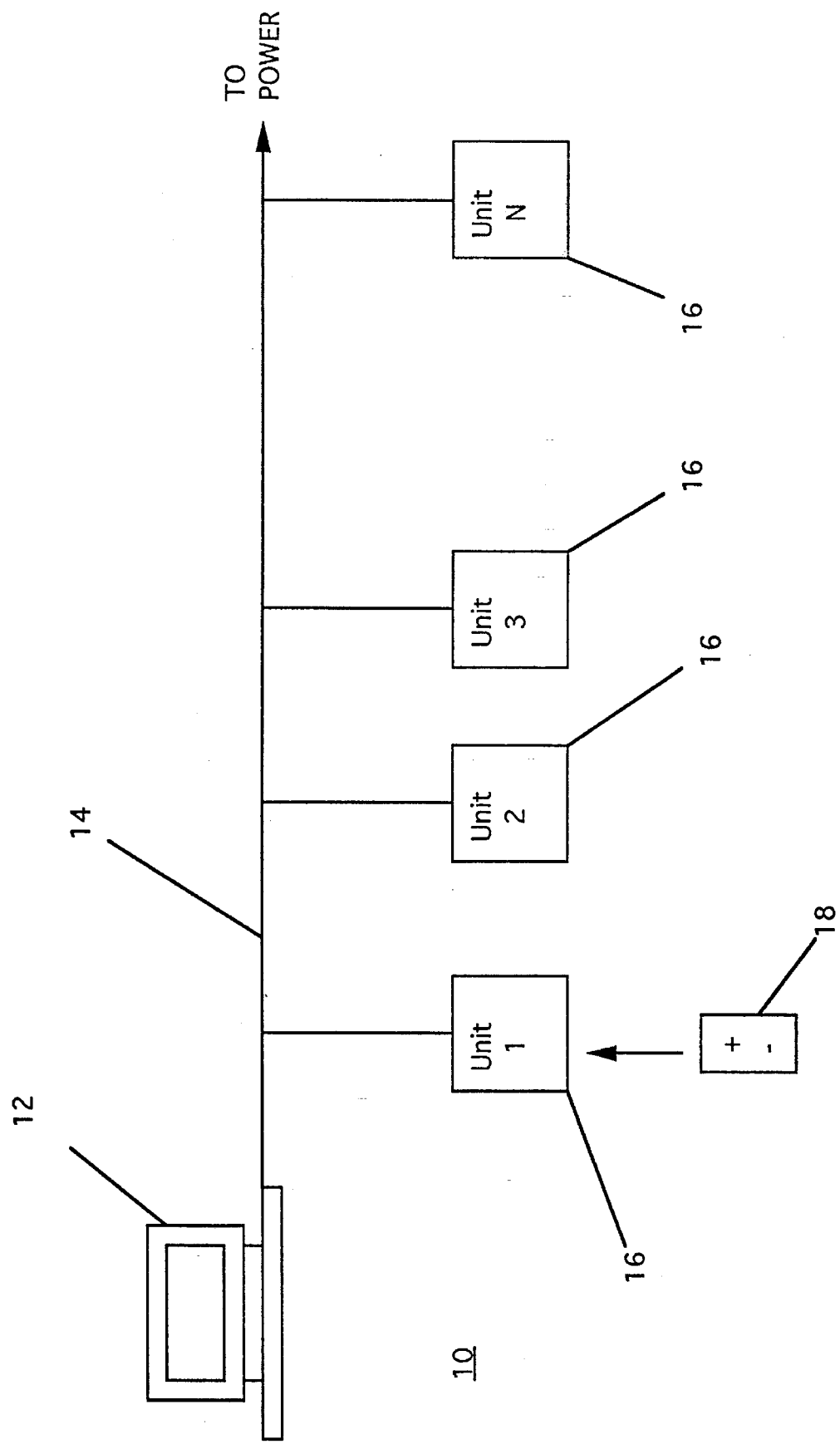
FIG. 1 is a block diagram of a battery charging system in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a block diagram of a battery charging system 10 in accordance with the invention. There is shown therein a system control device such as a system controller 12, a power line 14, a plurality of battery charging units 16, and a battery pack 18. The system controller 12 is preferably a personal computer since it has the advantages of being flexible and relatively inexpensive. The system controller 12 stores charge process instructions optimized for many different battery types, and is powered by power line 14. The power line 14 is a conventional power outlet such as 110 VAC or 220 VAC which is common to both the system controller 12 and the battery charging units 16. The battery charging units 16 include variable DC power sources responsive to a charge controller having a program memory space, and which charge a battery pack 18 when it is inserted into the charging units. The charging units are remotely located from the system controller 12, and may be conveniently located for individual users, such as on a desk or at a guard station.

Both the system controller 12 and the battery charging units 16 are equipped with a power line carrier (PLC) communications circuit. PLC communication is performed by modulating the AC voltage of the power line 14 with high frequency signals. The system controller 12 and each battery charging unit have a transmitter and a receiver section, combined into a transceiver (not shown). Data, either digital or analog, is signaled between the system control computer and the battery charging units over the power line using PLC communication. PLC communication is well known in the art and is commonly used in home control systems to control and monitor various household appliances and lamps. PLC communications can also be used with telephones to allow operation of a telephone remotely located from a telephone jack, but nearby a power outlet. The electronic circuits used to implement PLC communication are also well known, and accessory cards for personal computers including the transmitter and receiver sections are available.

Each battery charging unit is assigned a unique address and communicates with the system controller 12 over the power line 14 common to each of them. The operation of PLC communications is well known, but may be better appreciated by the following discussion. Briefly, in a system already using a transformer, such as a personal computer or battery charger, an additional winding is provided for the PLC circuit. This PLC winding is analogous to the antenna in a wireless radio frequency system. For the transmitter portion, a power amplifier with a complementary output is provided, which is capacitively coupled to the PLC winding. The amplifier receives its input signal through an opto-isolator from a digitally controlled oscillator that provides a frequency signal. When the device is transmitting, the oscillator is fed a serial data stream from the devices controller. The oscillator is turned on to indicate a digital "1", and turned off to indicate a digital "0", resulting in the frequency signal of the oscillator being digitally modulated in correspondence with the digital information being sent. The power amplifier couples the digitally modulated signal into the power line through the PLC winding of the transformer. To receive the transmitted signal, a frequency detector is connected to the PLC winding. This detector has a digital output of "1" whenever the correct frequency is detected, and a "0" when it is not present. The output is fed to the receiving device's controller by another opto-isolator. In this way the digitally modulated frequency signal is processed by the detector to produce a digital signal. This digital signal is fed to the device controller which decodes the information.

The battery pack used in connection with the system of FIG. 1 has a battery identification label such as a semiconductor memory or a bar code that uniquely identifies the particular battery type. Preferably the battery identification label is a simple serial number. When the battery pack 18 is inserted into any battery charging unit, the battery charging unit reads the battery identification number and communicates the information to the system controller 12. The system controller searches a database of charge instructions until it finds the instructions corresponding to the received identification number. When the correct set of charge instructions are located, the system controller communicates the instructions back to the particular charging unit which requested them. The charging unit then loads the charge instructions into a local memory and charges the battery accordingly, thereby providing the preferred charge regime.

Alternatively, the battery charging unit may send the battery identification to the system controller, which then begins to run the charge instructions. The system controller periodically interrogates the battery charging unit for relevant information such as voltage and temperature, and instructs the battery charging unit what to do. Examples of such commands may include reducing or increasing current, enforcing a voltage limit, stop charging, and change indicator lights. This would require the system controller to keep a running program for each battery charging unit.

Using this system, when a new set of battery charging instructions is made available, as upon the introduction of a new battery chemistry, it is loaded into the system controller. The new set of instructions may correspond to a battery with an advanced battery chemistry, or may be an updated set of instructions for an existing chemistry based on a new understanding of the chemical system. The advantage of this system is that there is almost no cost associated with this method since the battery charging units have already been purchased, and the charge instructions could very easily be transferred by a floppy disk.

Figure 2:
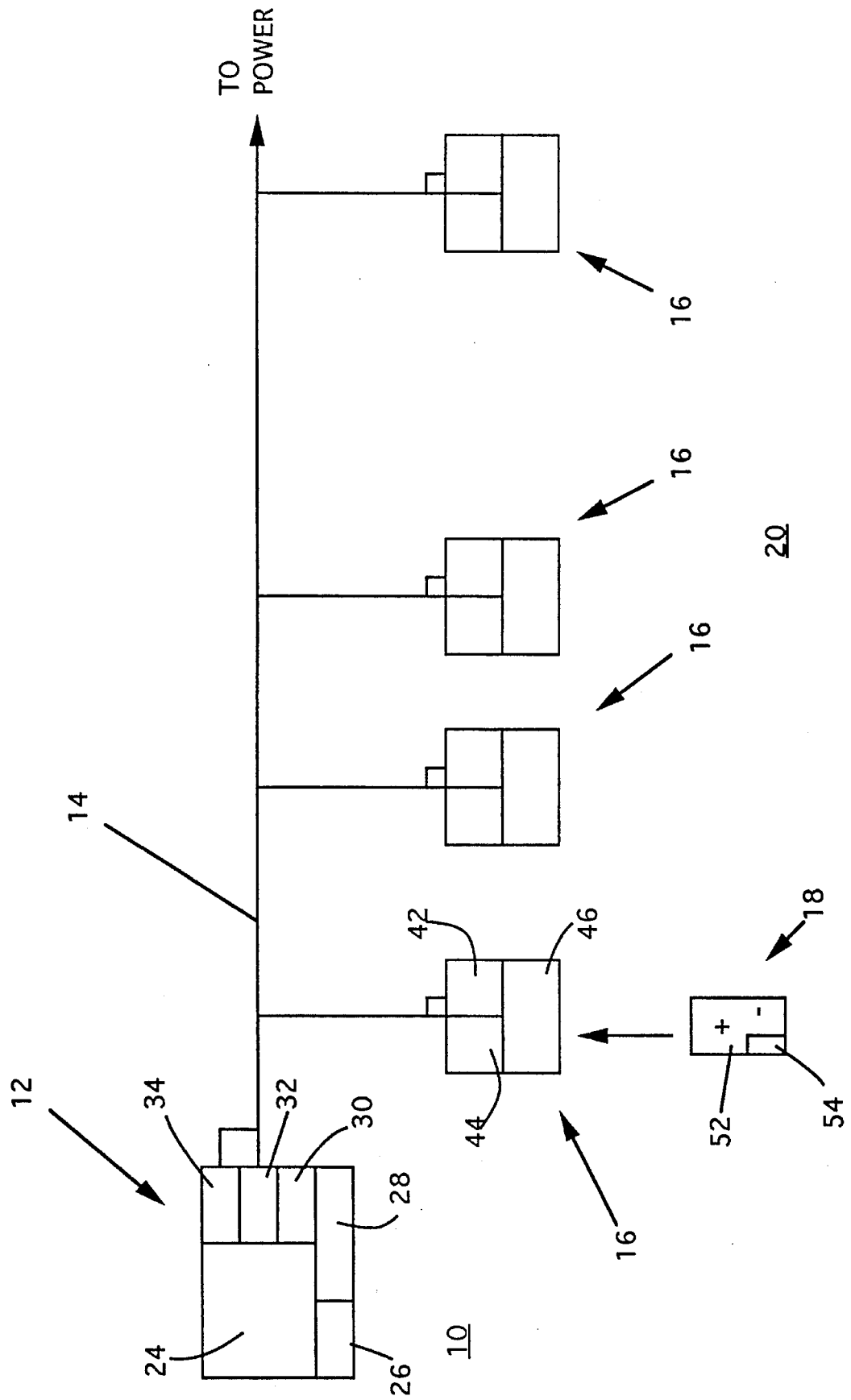
FIG. 2 is a schematic diagram of a battery charging system in accordance with the invention.

Referring now to FIG. 2, there is illustrated therein a detailed schematic overview diagram of a battery charging system 20 in accordance with the invention. The system controller 12 preferably has a display 24, input terminal 26, memory 28, processor 30, power supply 32, and communications module 34 which includes a receiver and a transmitter section. The display 24 allows a system administrator to view information contained in the system, and the input terminal 26 allows new battery charging instructions to be loaded into the system. The processor 30 preferably comprises ROM, RAM, and an internal hard disk drive. The processor 30 is preferably a microprocessor, such as a Motorola 68040 processor, and executes program instructions to control the battery charging system. The power supply 32 converts the AC power from the power line 14 into a form usable by the other components such as low voltage DC levels. The power line 14 is also connected to the communications module 34, which communicates with the battery charging units via PLC as described above.

The communications module 34 monitors the power line 14 for signals from different battery charging units. When a valid signal is sent, the communications module 34 receives a charger address and a battery identifier, and then passes this to the processor 30. The processor 30 then searches the memory 28 for a charge instruction file corresponding to the received battery identifier. Once the file is found, the processor 30 either sends the file to the particular battery charging units 16 through the communications circuit 34, or runs the program in a designated space in memory 28.

The battery charging units are substantially identical and hence only one will be described in detail. Each charging unit includes a PLC communications circuit 42 including transmitter and receiver sections, which are connected to the power line 14. Each battery charging unit further includes a variable power supply 44 for providing power to recharge batteries, and a charger controller 46. The battery pack 18 comprises at least one battery cell 52, and a battery identification means 54 as described above. The charger controller 46 monitors a set of charger contacts which electrically couple the battery pack 18 to the battery charging unit whenever the battery is inserted thereinto. When a battery is initially detected in the charger, the charger controller 46 ascertains the batteries identification and passes the information to the PLC communications circuit 42. The PLC communications circuit 42 then sends a notice or request to the system controller 12. The system controller 12 then takes action as described above.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charging system, comprising:

a battery pack including at least one battery cell and a battery identification means;

a system controller having a memory containing charge instructions corresponding to said battery pack;

at least one battery charging unit for charging said battery pack; and means for affecting communication between said system controller and said at least one battery charging unit via a common power line to which each battery charging unit and said system controller is connected.

2. A battery charging system as defined in claim 1, wherein said charge instructions are communicated to said at least one battery charging unit for charging said battery pack.

3. A battery charging system as defined in claim 1, wherein said system controller periodically interrogates said at least one battery charging unit for charging information, executes said charge instructions, and controls said at least one battery charging unit according to said charging information.

4. A battery charging system as defined in claim 1, wherein said battery charging unit includes a power line carrier (PLC) communications circuit.

5. A battery charging system as defined in claim 1, wherein said battery identification means is a semiconductor memory.

6. A battery charging system as defined in claim 1, wherein said battery identification means is bar code label.

7. A battery charging system, comprising:

a battery pack including at least one battery cell and a battery identification means for identifying a preferred charge regime for said at least one battery cell;

a system controller having a memory containing charge instructions corresponding to said battery pack, and a 1st PLC communications circuit;

at least one battery charging unit for charging said battery pack having a second PLC communications circuit; and wherein said at least one battery charging unit and said system controller communicate via a common power line by said first and second PLC communication circuits such that said battery pack is charged in accordance with said charge instructions.

8. A battery charging system as in claim 7, wherein said charge instructions corresponding to said battery pack are sent to said at least one battery charging unit for execution.

9. A battery charging system as in claim 7, wherein said system controller periodically interrogates said at least one battery charging unit for charging information, executes said charge instructions, and controls said at least one battery charging unit according to said charge instructions.

10. A battery charging system as in claim 7, wherein said battery identification means is a semiconductor memory.

11. A battery charging system as in claim 7, wherein said battery identification means is in bar code label.

12. A battery charging system as in claim 7, wherein said system controller is a personal computer.

* * * * *